US008572739B1

(12) United States Patent
Cruz et al.

(10) Patent No.: US 8,572,739 B1
(45) Date of Patent: Oct. 29, 2013

(54) DETECTION OF MALICIOUS MODULES INJECTED ON LEGITIMATE PROCESSES

(75) Inventors: Marvin Ubaldo Cruz, Bulacan (PH); Michelle de la Pena Perona, Pasig (PH); Benjamin Rivera, Bulacan (PH); Kerr Bryner Ang, Caloocan (PH)

(73) Assignee: Trend Micro Incorporated, Tokyo (JP)

( * ) Notice: Subject to any disclaimer, the term of this patent is extended or adjusted under 35 U.S.C. 154(b) by 796 days.

(21) Appl. No.: 12/606,833

(22) Filed: Oct. 27, 2009

(51) Int. Cl.
*G06F 11/10* (2006.01)
*G06F 12/14* (2006.01)
*G06F 12/16* (2006.01)
*G08B 23/00* (2006.01)

(52) U.S. Cl.
USPC .................. 726/24; 726/22; 726/23; 726/25

(58) Field of Classification Search
USPC .................................................... 726/22–25
See application file for complete search history.

(56) References Cited

U.S. PATENT DOCUMENTS

| 7,496,757 | B2 | 2/2009 | Abbott et al. | |
|---|---|---|---|---|
| 7,523,472 | B2 | 4/2009 | D'Souza et al. | |
| 2004/0143751 | A1 | 7/2004 | Peikari | |
| 2006/0053492 | A1* | 3/2006 | Wallace | 726/26 |
| 2006/0136890 | A1 | 6/2006 | Jodh | |
| 2006/0282827 | A1* | 12/2006 | Yeap et al. | 717/130 |
| 2006/0288420 | A1 | 12/2006 | Mantripragada et al. | |
| 2007/0067623 | A1* | 3/2007 | Ward | 713/164 |
| 2008/0016339 | A1* | 1/2008 | Shukla | 713/164 |
| 2009/0125986 | A1 | 5/2009 | Kiester et al. | |
| 2009/0126012 | A1* | 5/2009 | Treadwell et al. | 726/22 |
| 2009/0133126 | A1* | 5/2009 | Jang et al. | 726/24 |

OTHER PUBLICATIONS

Hart, Ken. "Programs that clean up your hard drive and wipe out clone files". HighBeam Research. <http://www.highbeam.com/doc/1G1-19662962.html/print>. Published: Sep. 1, 1997.*
AnalogX. (Mar. 27, 2009). DLL Archive (Version 1.01) [Computer Software]. Available from: http://www.analogx.com/files/dllarchi.exe. Evidenced by: DLL Archive Documentation captured by Wayback Machine <http://web.archive.org/web/20090327104722/http://www.analogx.com/contents/download/System/dllarch/Documentation.htm>.*

* cited by examiner

*Primary Examiner* — Jeffrey D Popham
*Assistant Examiner* — Kevin Bechtel
(74) *Attorney, Agent, or Firm* — Okamoto & Benedicto LLP

(57) ABSTRACT

A computer includes modules that provide a shared library of functions callable by processes or other modules. A malicious module in the computer may be identified by enumerating modules needed by a process to operate. Modules currently loaded in the memory of the computer are also enumerated. A suspect or suspicious module may be identified as currently being loaded in the memory of the computer but not needed by a process to operate. The suspicious module may be deemed malicious (i.e., having malicious code, such as a computer virus) if the suspicious module does not export or provide a function for sharing to be called by other modules or process.

10 Claims, 3 Drawing Sheets

DETECTION OF MALICIOUS MODULES INJECTED ON LEGITIMATE PROCESSES

BACKGROUND OF THE INVENTION

1. Field of the Invention

The present invention relates generally to computer security, and more particularly but not exclusively to methods and apparatus for detecting malicious modules.

2. Description of the Background Art

A module is an executable file that serves as a shared library of functions. The codes of the functions are grouped together in the module file. A module advantageously allows a process to call a function that is not part of the process' program code. A dynamic-link library (DLL) is a commonly known module employed in operating systems, such as the Microsoft Windows™ operating system. Dynamic linking allows a process to call a function whose program code is in a separate DLL file. The DLL contains one or more functions that are compiled, linked, and stored separately from the processes that use them. Multiple applications can simultaneously access the contents of a single copy of a DLL in memory.

While DLLs facilitate the sharing of data and resources, they pose a computer security issue in that malicious code writers may use DLLs to hide malicious codes (e.g., computer viruses) in legitimate processes. One method used by malicious code writers is to inject or load a malicious DLL on a legitimate process. This method is referred to as DLL injection, which can be though of as malicious code piggy-backing on a legitimate process.

DLL injection provides several advantages to malicious code writers. First, DLL injection is a good way to hide a running malicious code. Malicious code running separately as a stand-alone process generally stands out and is thus readily detectable. An experienced system administrator using commonly available process enumeration tools (e.g., Windows™ operating system's TaskManager, ProcessExplorer, etc.) could readily identify and terminate suspicious malicious processes.

Second, DLL injection offers superior protection from clean-up. Once injected on a running process, malicious DLL is very difficult to unload or remove from its host process. Forced unloading of injected DLL could cause instability on the host process. A relatively easy and safe way to remove an injected DLL is to terminate the host process. However, there are critical processes (e.g. Winlogon.exe, Smss.EXE, Svchost.exe, etc. in Windows™ operating system) that cannot be terminated without incurring instability on the entire operating system.

Third, DLL injection on a process of a trusted application (e.g., web browser programs, utility programs, etc) allows the malicious code to inherit the trust normally given the trusted application. For example, malicious DLL may be injected inside a web browser process (e.g. Internet Explorer™ or Fire Fox™ web browser). The injected malicious code could then easily connect to a remote and malicious web server without incurring suspicion or alarm from a firewall or intrusion detection system (IDS). This is made possible by the DLL injection being done under the context of the usually trusted web browser process.

SUMMARY

In one embodiment, a computer includes modules that provide a shared library of functions callable by processes or other modules. A malicious module in the computer may be identified by enumerating modules needed by a process to operate. Modules currently loaded in the memory of the computer are also enumerated. A suspect or suspicious module may be identified as currently being loaded in the memory of the computer but not needed by a process to operate. The suspicious module may be deemed malicious (i.e., having malicious code, such as a computer virus) if the suspicious module does not export or provide a function for sharing to be called by other modules or process.

These and other features of the present invention will be readily apparent to persons of ordinary skill in the art upon reading the entirety of this disclosure, which includes the accompanying drawings and claims.

Figure 1:
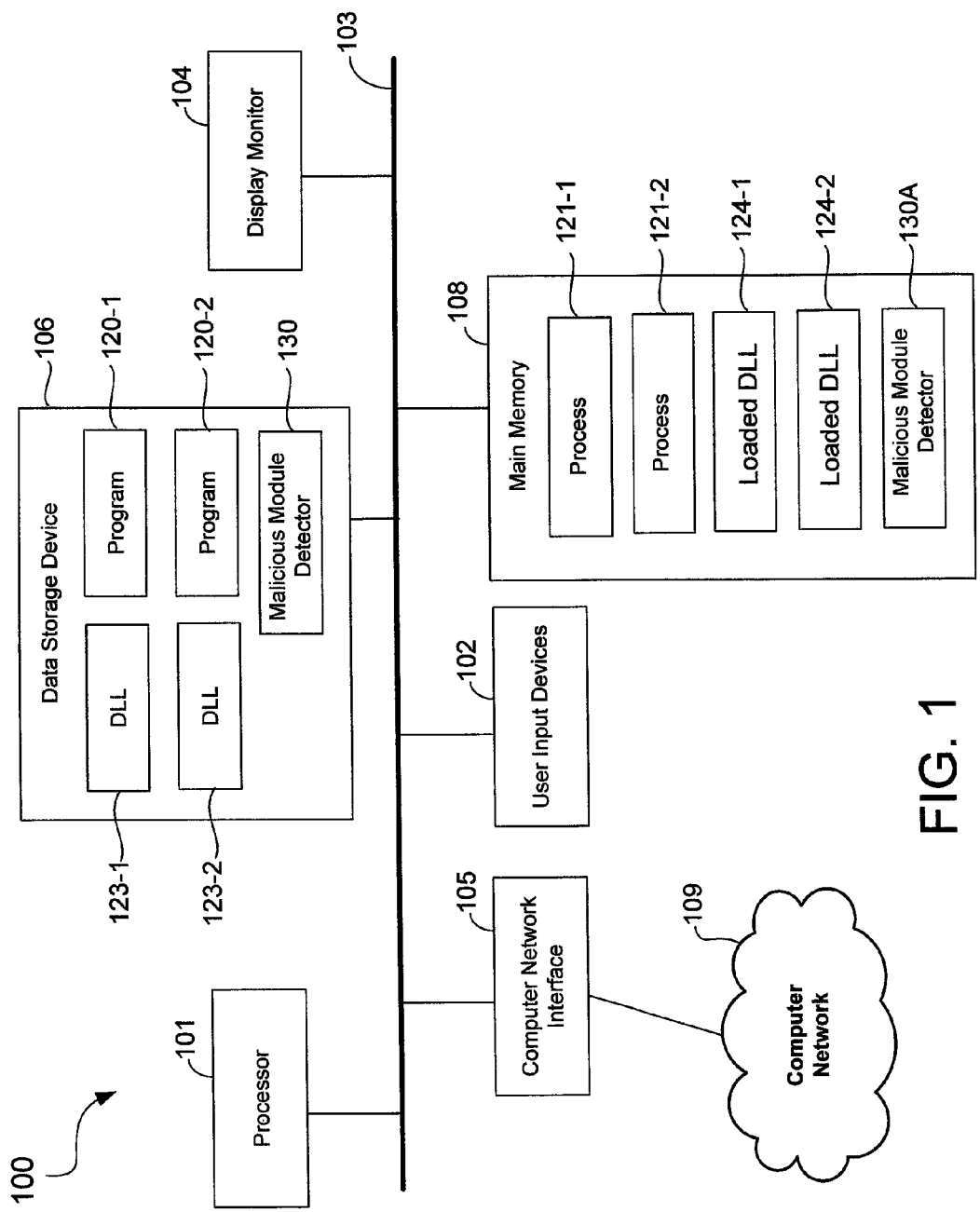
FIG. 1 shows a schematic diagram of a computer in accordance with an embodiment of the present invention.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the work of a particular component. Likewise, computer memory may be configured to include one or more components, which may be executed by a processor. Software components may be implemented in logic circuits, for example. Components may be implemented separately in multiple modules or together in a single module.

Techniques for combating malicious codes are referred to as antivirus. Traditional antivirus products protect their customers using a pattern-matching algorithm. The idea is to check every file on the customer's computer for a possible match of malicious signature. The problem with this approach is that it operates on files in data storage devices (e.g., hard disk), while DLL injection affects processes in main memory. Although a malicious DLL would still originate from a file, it is possible for malicious DLL to delete its file after injecting its code. Another problem with pattern-matching is that the antivirus product needs a constantly updated pattern file of malicious code signatures. To confound this problem, the number of malicious codes is constantly on the rise, increasing the size of the pattern file. Not only is this a reactive a solution, but also consumes a lot of network bandwidth and data storage space to deploy to customers.

Another possible solution against DLL injection is to have a monitor program that looks for attempts to open and write data on another process, which is a behavior exhibited by DLL injection. This approach has its own drawbacks. First, the monitor program will not be able to detect malicious DLL that was injected on a legitimate process before the monitor program is up and running. Second, the monitor program consumes relatively large amounts of memory and central processing unit (CPU) resources because it has to be running all the time. Third, this approach is prone to false alarm or may need constant user interaction or discretion (e.g., always asking the user to allow or deny detected DLL injection, even for legitimate DLLs).

Yet another possible solution is to scan memory process space for malicious codes. This solution still uses a pattern-matching algorithm, albeit performed on processes rather than files. This approach has the disadvantages of pattern-matching solutions, including frequent updating of its pattern file to keep up with the ever increasing number of malicious codes.

Embodiments of the present invention provide a novel solution against malicious module injection as follows.

FIG. 1 shows a schematic diagram of a computer 100 in accordance with an embodiment of the present invention. The computer 100 may be employed as a customer computer, for example. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more non-volatile data storage devices 106 (e.g., hard disk, optical disk, universal serial bus (USB) memory), a display monitor 104 (e.g., liquid crystal display (LCD), flat panel monitor, cathode ray tube (CRT)), a computer network interface 105 (e.g., network adapter, modem), and a main memory 108 (e.g., random access memory (RAM)). The computer network interface 105 may be coupled to a computer network 109, which in this example includes the Internet.

In the example of FIG. 1, the data storage device 106 includes computer programs 120 (i.e., 120-1, 120-2, . . . ), DLLs 123 (i.e., 123-1, 123-2, . . . ), and a malicious module detector 130. A program comprises a set of computer-readable program codes and/or data stored on a data storage medium, such as a hard disk. A DLL is a program but is labeled separately in FIG. 1 for clarity of illustration. A program may be in the form of computer files. For illustration purposes, the computer 100 runs the Microsoft Windows™ operating system. Accordingly, the files may have extension names such as .exe, .scr, and .com, for example. A process is an instance of a running program, and comprises a set of computer-readable program code loaded in main memory. In the example of FIG. 1, the processes 121 (i.e., 121-1, 121-2, . . . ) in the main memory 108 are running instances of their respective programs 120. That is, running the program 120-1 results in the program 120-1 being loaded and run in the main memory 108 as the process 121-1, running the program 120-2 results in the program 120-2 being loaded and run in the main memory 108 as the process 121-2, and so on.

The DLLs 123 are the modules in the computer 100. A DLL is an executable file that serves as a shared library of functions, with the functions being callable by separate processes and other DLLs. The codes for the functions are grouped together and put on a separate file, generally having .DLL extension name. Most of the DLLs found in a typical system are provided by the operating system. A process may call a function in a DLL to do its task. A DLL is loaded into the main memory for use by a process. In the example of FIG. 1, a loaded DLL 124-1 represents the DLL 123-1 loaded and running in the main memory 108, a loaded DLL 124-2 represents the DLL 123-2 loaded and running in the main memory 108

Executable files under the Microsoft Windows™ operating system typically follow the Portable Executable (PE) format. An import directory table (IDT) is a section in a PE format file that describes and details DLLs needed by the program to execute properly. A DLL may also have an IDT to describe and detail other DLLs that it needs to execute. As particular example, a program file may have an IDT listing all DLLs needed by the program, each DLL listed in the program's IDT may have its own IDT listing all DLLs needed by that DLL and so on.

An export directory table (EDT) is a section in a PE format file that describes and details functions that are internal to the program and are exported for sharing with other programs. For example, a DLL may have an EDT that lists the DLL's functions that are shared with and callable by other programs, which may include other DLLs. Executable program files that do not export functions have a nullified EDT.

A malicious module detector 130 comprises computer-readable program code for detecting malicious modules. In the example of FIG. 1, the malicious module detector 130 is configured to detect a malicious DLL injected on a legitimate process. The malicious module detector 130A in the main memory 108 represents the process of the malicious module detector 130 executing in the main memory 108.

Figure 2:
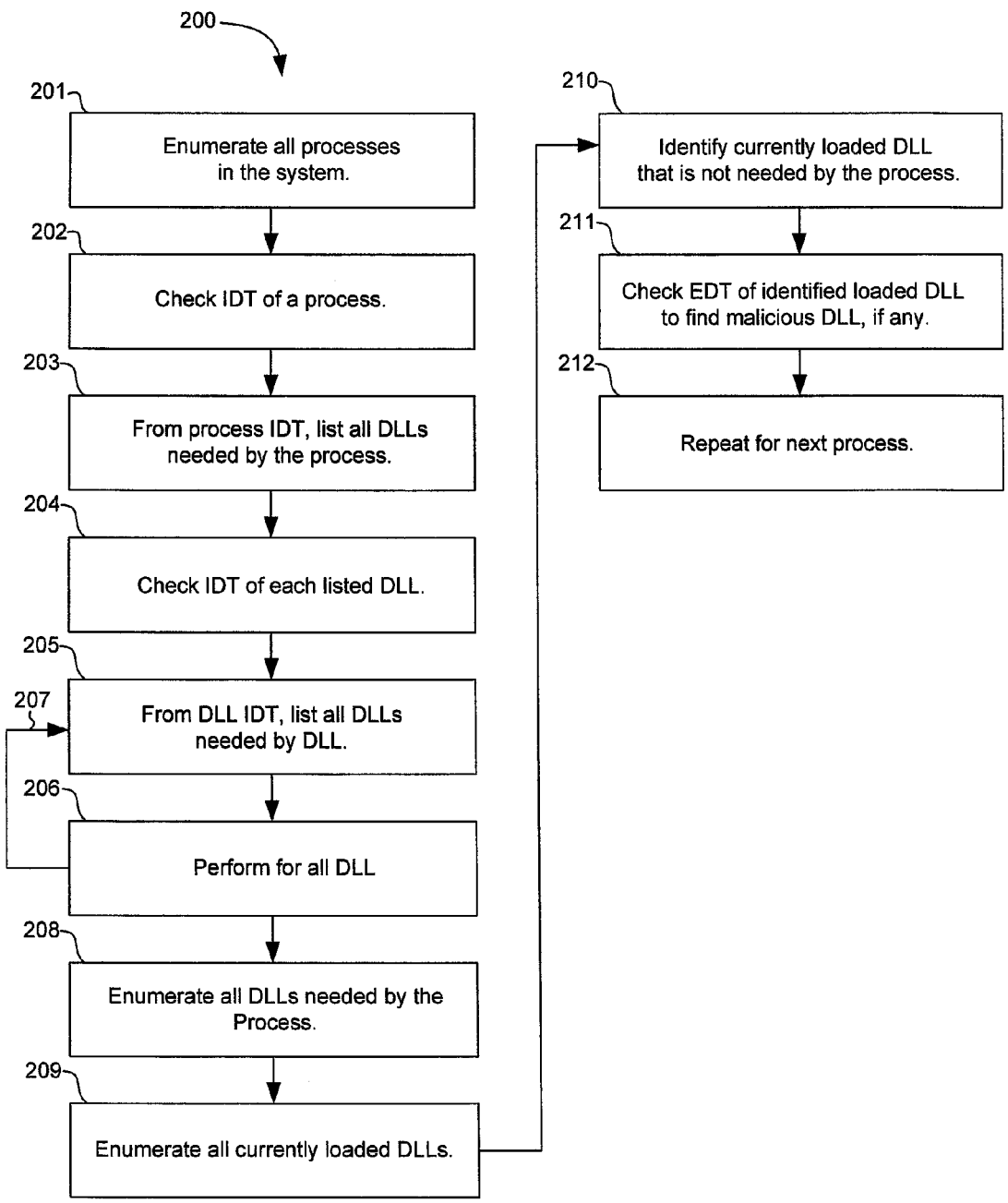
FIG. 2 shows a flow diagram of a method of detecting a malicious module injected on a legitimate process in accordance with an embodiment of the present invention.
Figure 3:
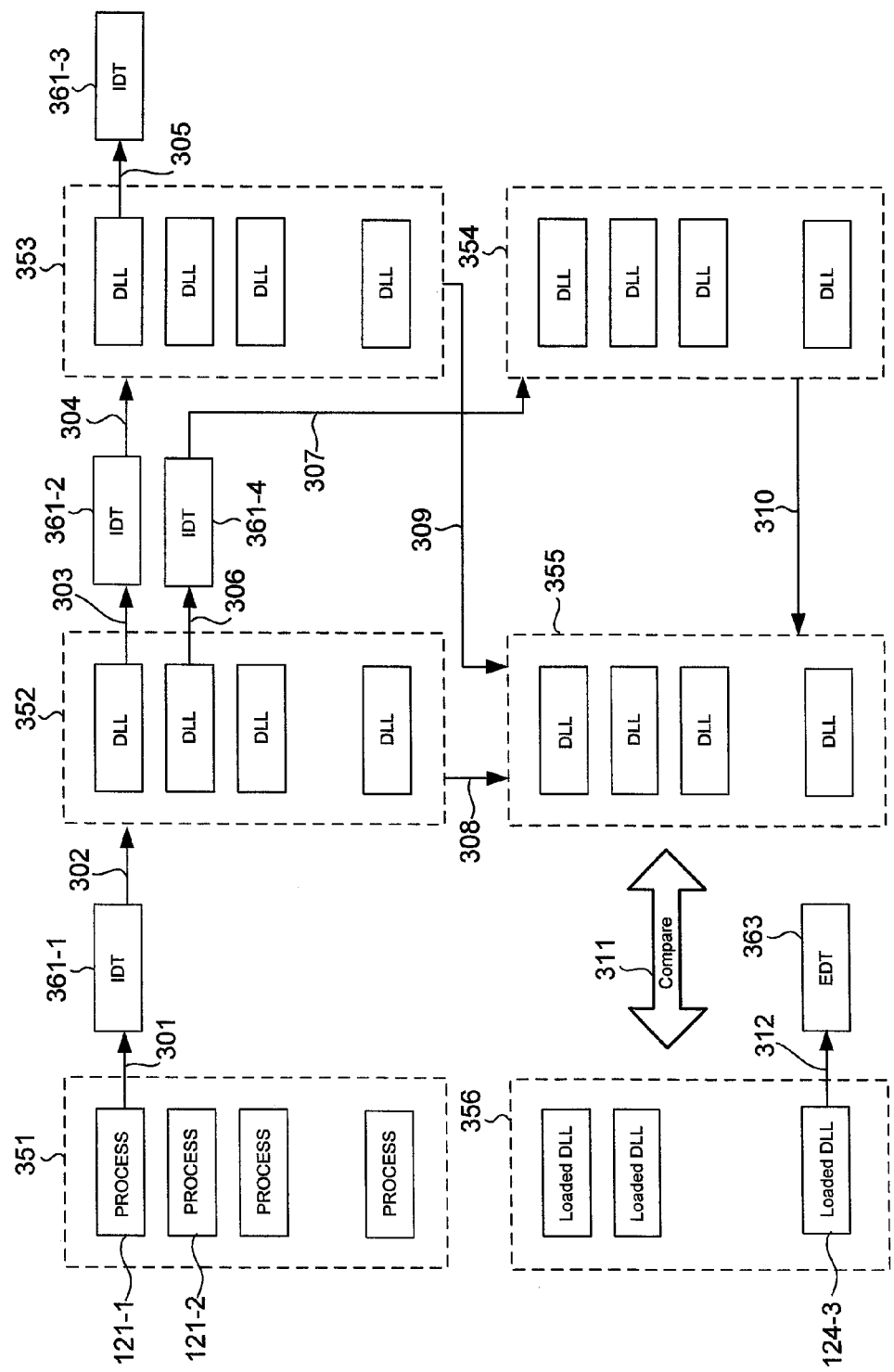
FIG. 3 shows a flow diagram illustrating an example operation of the method of FIG. 2.

FIG. 2 shows a flow diagram of a method 200 of detecting a malicious module injected on a legitimate process in accordance with an embodiment of the present invention. FIG. 3 shows a flow diagram illustrating an example operation of the method 200. The method 200 will be described with reference to FIG. 3 and using the Microsoft Windows™ operating system for illustration purposes only. The method 200 may be performed by the malicious module detector 130 running in the computer 100 of FIG. 1.

The method 200 begins with enumerating all processes running in the computer (FIG. 2, step 201). This is represented in FIG. 3 with the list 351 enumerating the processes running in the computer 100. Starting with the process 121-1 enumerated on the list 351, the IDT 361-1 of the process 121-1 is checked for all DLLs needed by the process 121-1 to execute properly (FIG. 2, step 202; FIG. 3, arrow 301). The IDT 361-1 identifies all DLLs needed by the process 121-1 to execute properly. In FIG. 3, these DLLs are enumerated in a list 352 (FIG. 2, step 203; FIG. 3, arrow 302).

The IDT of each DLL on the list 352 are checked for all DLLs needed by the DLL (FIG. 2, step 204). As shown in FIG. 3, a DLL on the list 352 has an IDT 361-2 that enumerates all DLLs need by that DLL (FIG. 3, arrow 303), another DLL on the list 352 has an IDT 361-4 that enumerates all DLLs need by that DLL (FIG. 3, arrow 306), and so on. All DLLs needed by a DLL on the list 352 to operate are enumerated in a listing (FIG. 2, step 205). A list 353 enumerates all DLLs needed by a DLL on the list 352 (FIG. 3, arrow 304), a list 354 enumerates all DLLs needed by another DLL on the list 352 (FIG. 3, arrow 307), and so on. The enumeration of all DLLs needed by other DLLs to execute properly are repeated to identify DLLs that import functions from other DLLs (FIG. 2, step 206, arrow 207). For example, a DLL on the list 353 may have an IDT 361-3 that lists other DLLs from which it imports one or more functions (FIG. 3, arrow 305).

With the above-described operation, all DLLs needed by a process would be enumerated (FIG. 2, step 208). This is illustrated in FIG. 3 where a list 355 includes all DLLs identified as being needed by the process 121-1 to properly execute (FIG. 3, arrows, 308, 309, 310). The DLLs on the list 355 have one or more functions that are called directly or indirectly by the process 121-1. Duplicate DLLs may be removed from the list 355.

All currently loaded DLLs are enumerated (FIG. 2, step 209). This allows for identification of DLLs that are currently loaded in memory, and are thus presumably being used by one or more processes. In FIG. 3, a list 356 enumerates all currently loaded DLLs. The list 356 is compared to the list 355 to identify one or more currently loaded DLLs that are not needed by the process 121-1 to properly execute (FIG. 2, step 210). This allows for identification of DLLs that are loaded in memory (i.e., on the list 356) but are not needed by the process 121-1 (i.e., not on the list 355). As can be appreciated, the DLLs not needed by the process 121-1 are those not having a function called by the process 121-1 directly or indirectly (i.e., through a DLL called by another DLL, etc.).

In the example of FIG. 3, a currently loaded DLL 124-3 enumerated on the list 356 has been identified as not being needed by the process 121-1 by comparing the DLLs on the list 356 to DLLs on the list 355 (FIG. 3, arrow 311). The DLL 124-3 is suspicious in that it is currently loaded but not needed by the process 121-1. However, the DLL 124-3 is not necessarily malicious because it may have a function called by another process (i.e., may be needed by another process). To determine whether or not the DLL 124-3 is malicious, the export directory table (EDT) 363 of the DLL 124-3 is examined to identify functions, if any, that the DLL 124-3 exports and shares with processes or other DLLs (FIG. 2, step 211). If the EDT 363 is null, i.e., not having an entry, indicating that it does not export or share any function, the DLL 124-3 is deemed to be malicious. Otherwise, if the EDT 363 identifies a function that it exports or shares, the DLL 124-3 is deemed to be legitimate (i.e., not malicious).

The steps of the method 200 may be repeated for the next process enumerated on the list 351 (FIG. 2, step 212). For example, the same operation may be performed for the process 121-2, then for the next process, and so on until all processes in the computer 100 have been checked for malicious modules.

As can be appreciated from the foregoing, the just described technique for identifying malicious modules can be performed without scanning modules for particular malicious patterns. In addition, the technique may be performed without having to constantly monitor modules for malicious activity, allowing for detection of malicious modules without substantial burden on processing resources.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of detecting a malicious module in a computer, the method comprising:

the computer enumerating a first set of dynamic link libraries (DLLs) needed by a process running in the computer to operate, enumerating a second set of DLLs needed by a DLL in the first set of DLLs to operate, and enumerating a third set of DLLs needed by another DLL in the second set of DLLs to operate, the first, second, and third sets of DLLs being enumerated while the process is already running in the computer;

the computer enumerating a fourth set of DLLs, the fourth set of DLLs comprising DLLs of the process and of other processes that are currently loaded in a main memory of the computer;

the computer identifying a first DLL that is in the fourth set of DLLs but not in any of the first, second, and third sets of DLLs; and the computer deeming the first DLL as malicious when the first DLL does not include a function that the first DLL exports to be callable by another DLL or process running in the computer.

2. The method of claim 1 wherein enumerating the first, second, and third sets of DLLs comprises:

the computer inspecting an import directory table of the process to identify the first set of DLLs; and the computer inspecting an import directory table of each DLL in the first, second, and third sets of DLLs to identify additional sets of DLLs needed by the process to operate.

3. The method of claim 1 wherein the method is performed for all processes running in the computer.

4. The method of claim 1 wherein the first DLL includes a computer virus.

5. The method of claim 1 wherein deeming the first DLL as malicious comprises:

the computer checking an export directory table of the first DLL; and the computer determining that the export directory table of the first DLL does not identify a function of the first DLL that is shared by the first DLL with another DLL or process running in the computer.

6. A computer having main memory, a processor, and a data storage device, the computer comprising:

a plurality of processes running in the main memory;

a plurality of dynamic-link libraries (DLLs) loaded from the data storage device and into the main memory, the plurality of DLLs being DLLs of the plurality of processes; and a malicious module detector comprising computer-readable program code loaded from the data storage device to run in the main memory, the malicious module detector being configured to enumerate a first set of DLLs referenced by a first process in the plurality of processes, enumerate a second set of DLLs referenced by a DLL in the first set of DLLs, enumerate a third set of DLLs referenced by another DLL in the second set of DLLs, and identify a first DLL in the plurality of DLLs but not in any of the first, second, and third sets of DLLs, wherein the first DLL does not have a function called by a first process in the plurality of processes and the malicious module detector is configured to deem the first DLL as malicious when the first DLL does not identify a function that the first DLL shares with another DLL or process running in the computer.

7. The computer of claim 6 wherein the second set of DLLs is generated from an import directory table of the first process and import directory tables of DLLs enumerated in the import directory table of the first process.

8. The computer of claim 6 wherein the malicious module detector is further configured to identify a second DLL not having a function called by a second process in the plurality of processes.

9. The computer of claim 6 wherein the first DLL includes a computer virus.

10. The computer of claim 6 wherein the malicious module detector is configured to examine an export directory table of the first DLL to find that the first DLL does not export any function for use by other DLLs.

* * * * *